J. G. WILSON,

Assignor, by mesne assignments, to G. WILSON.

Rolling Shutter.

No. 9,047. Reissued Jan. 13, 1880.

WITNESSES:

Howard F. Stewart

Joseph F. Vermilye

INVENTOR:

J. G. Wilson

N. PETERS, PHOTO-LITHOGRAPHER, WASHINGTON, D. C.

UNITED STATES PATENT OFFICE.

JAMES G. WILSON, OF NEW YORK, N. Y., ASSIGNOR, BY MESNE ASSIGNMENTS, TO GRACE WILSON.

ROLLING SHUTTER.

SPECIFICATION forming part of Reissued Letters Patent No. 9,047, dated January 13, 1880.

Original No. 155,398, dated September 29, 1874. Application for Reissue filed December 1, 1879.

*To all whom it may concern:*

Be it known that I, JAMES GODFREY WILSON, of the city, county, and State of New York, have invented a certain new and useful Improvement in Rolling Shutters, of which the following is a specification.

This invention relates to rolling shutters; and it consists in securing the slats or laths to each other, edge to edge, by means of bands of steel or other suitable material passing transversely in mortises through the slats, and jagged or cut in such a manner as to form a series of barbs or teeth, each inclined in the same direction.

The bands are inserted in the slats by passing them backward with respect to the barbs or teeth, so that their points extend opposite to the direction of insertion, and form a succession of inclined planes, which move readily past the sides of the mortises. When, however, the bands are drawn into their proper places, the projecting points of the teeth prevent any motion of the bands in the opposite direction, because they will engage the sides of the mortises in that direction, and consequently the slats or laths are held securely to each other and to the bands, and as the bands are elastic, they permit the slats to be rolled or wound up, their edges being fitted with a rounded tongue-and-groove joint, which permits the slats to move on each other at their edges, and serves to conceal the bands where they pass through from the front edge of one slat to the back edge of the next.

This invention is illustrated in the accompanying drawings, in which—

Figure 1:
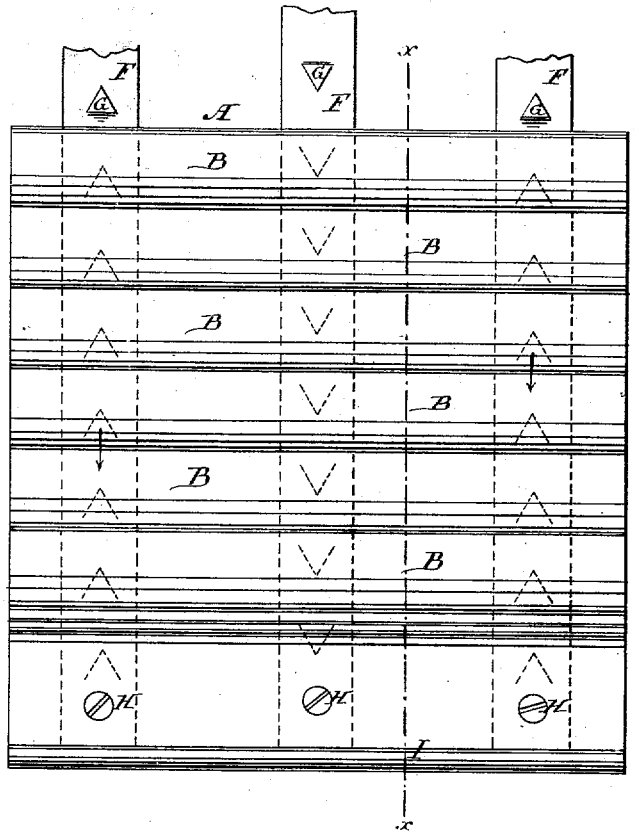
Figure 2:
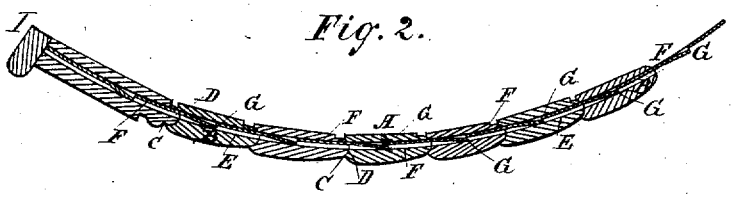

Figure 1 is an elevation of a portion of a shutter made according to my invention. Fig. 2 is a vertical section thereof, taken in the plane of the line *x x* of Fig. 1.

Similar letters indicate corresponding parts.

The letter A in these drawings designates the shutter, composed, in this example, of narrow slats B, of wood, to which material for such shutters my invention is especially suitable.

The slats are arranged edgewise to each other, the edge C of one slat being rounded and placed in a groove, D, made in the adjacent edge of the next slat, so that the edges of the groove of one slat will overlap and conceal the edge C of the other slat, and yet permit the free movement of the slats on each other at their adjacent edges.

The slats of the shutter are mortised transversely from edge to edge, as indicated in dotted outlines, there being as many lines of mortises as there are bands to be employed. In this example there are three lines of mortises, E, to receive three bands, F, on which the slats are mounted.

The bands F are preferably made of steel or other metal possessing a good degree of elasticity and strength, provided with teeth G, which may be produced, as in this example, by cutting or punching and forcing out on one side a series of angular teeth from the body of the band at suitable intervals, according to the width of the slats, so that there will be a tooth for each slat. The bands may, however, be serrated or provided with teeth in any other convenient manner which will accomplish the result sought after. The teeth on any particular band must point in the same direction.

The ends of the bands are fastened to the upper and lower slats of the shutter by means of a screw, H, or other fastening, and the ends of the mortises are concealed by strips like that shown at I.

The slats having been prepared, mortised, and arranged edge to edge, toothed bands F are drawn through the mortises in the direction opposite to the inclination of the teeth and fastened at the ends. Any desired number of bands may be thus drawn through mortises in the slats.

I have found it preferable in some cases to introduce the bands in opposite directions, the construction and arrangement being such that the slats are automatically engaged by the teeth of the bands, so that they cannot shift from their places nor move laterally on the bands; but, by reason of the elastic nature of the bands and the character of their fastenings, the slats are free to move on their joints when the shutter is rolled up.

What I claim as new, and desire to secure by Letters Patent, is—

1. The combination of mortised slats and toothed bands, substantially as described, and for the purpose set forth.

2. The toothed bands F, arranged in the slats of a rolling shutter so that the teeth of one or more of the bands point in opposite directions from the teeth of the other bands of the shutter, substantially as set forth.

JAS. G. WILSON.

Witnesses:
JOS. F. VERMILYE,
HOWARD F. STREVER.